United States Patent
Moskal et al.

(10) Patent No.: US 11,084,924 B2
(45) Date of Patent: *Aug. 10, 2021

(54) MOLDABLE COMPOSITIONS AND METHODS OF USING THEREOF

(71) Applicant: Crayola LLC, Easton, PA (US)

(72) Inventors: Michael G. Moskal, Pottstown, PA (US); Anthony C. Drago, III, Philadelphia, PA (US); David E. Rowan, Bethlehem, PA (US); Michael L. Spera, Mohnton, PA (US); Eric Alexander Boschi, Bethlehem, PA (US)

(73) Assignee: Crayola LLC, Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/969,253

(22) Filed: May 2, 2018

(65) Prior Publication Data

US 2019/0016877 A1   Jan. 17, 2019

Related U.S. Application Data

(60) Provisional application No. 62/533,348, filed on Jul. 17, 2017.

(51) Int. Cl.
| | | |
|---|---|---|
| C08L 29/04 | (2006.01) | |
| C08L 3/02 | (2006.01) | |
| C08K 3/38 | (2006.01) | |
| C08K 3/22 | (2006.01) | |
| C08K 5/053 | (2006.01) | |
| C08K 3/26 | (2006.01) | |
| C08L 5/00 | (2006.01) | |
| C08K 3/34 | (2006.01) | |

(52) U.S. Cl.
CPC ............ *C08L 29/04* (2013.01); *C08K 3/22* (2013.01); *C08K 3/26* (2013.01); *C08K 3/38* (2013.01); *C08K 5/053* (2013.01); *C08L 3/02* (2013.01); *C08L 5/00* (2013.01); *C08K 3/346* (2013.01); *C08K 2003/262* (2013.01); *C08K 2003/387* (2013.01)

(58) Field of Classification Search
CPC ... C08L 5/00; C08L 3/02; C08L 29/04; C08K 2003/346; C08K 2003/387; C08K 3/38
See application file for complete search history.

(56) References Cited

U.S. PATENT DOCUMENTS

| | | |
|---|---|---|
| 5,171,766 A | 12/1992 | Mariano et al. |
| 5,364,892 A | 11/1994 | Miller et al. |
| 5,395,873 A | 3/1995 | Mizoule |
| 5,498,645 A | 3/1996 | Mariano et al. |
| 5,506,280 A | 4/1996 | Miller et al. |
| 5,628,821 A | 5/1997 | Bowling et al. |
| 5,679,145 A | 10/1997 | Anderson et al. |
| 5,916,949 A | 6/1999 | Shapero et al. |
| 5,972,092 A * | 10/1999 | Cordova ................ C08L 99/00 106/126.3 |
| 5,990,205 A * | 11/1999 | Cordova ............. C08K 5/0008 524/157 |
| 6,359,057 B1 * | 3/2002 | Li ........................... C08K 3/38 524/557 |
| 6,515,054 B1 * | 2/2003 | Matsushita ............ C08L 67/02 524/156 |
| 7,897,659 B2 | 3/2011 | Leung |
| 8,282,726 B2 | 10/2012 | Spreuwers |
| 8,518,171 B2 | 8/2013 | Uang |
| 10,138,358 B2 * | 11/2018 | Nguyen ................... C08L 3/02 |
| 2007/0238815 A1 | 10/2007 | Lee et al. |
| 2011/0146534 A1 * | 6/2011 | Uang ....................... C08K 5/01 106/213.1 |
| 2017/0058109 A1 * | 3/2017 | Nguyen ................... C08L 3/02 |

FOREIGN PATENT DOCUMENTS

| | | |
|---|---|---|
| CN | 102058986 A | 5/2011 |
| CN | 103651654 A | 3/2014 |
| CN | 106317469 A | 1/2017 |
| DE | 3609158 C1 | 6/1987 |
| RU | 225946 C1 | 5/2005 |
| RU | 2259448 C2 | 8/2015 |
| WO | 2016128582 A1 | 8/2016 |

OTHER PUBLICATIONS

Handbook of Fillers, Wypych George, 2nd Ed., 2000, p. 75 (Year: 2000).*
Great Britain Combined Search and Examination Report for Application No. GB1811246.6, dated Dec. 19, 2018, 2 pages.
Great Britain Examination Report for Application No. GB1811246.6, dated Aug. 7, 2020, 1 page.

* cited by examiner

*Primary Examiner* — Satya B Sastri
(74) *Attorney, Agent, or Firm* — RatnerPrestia

(57) ABSTRACT

The present invention provides moldable compositions that are capable of resisting slumping and cracking when allowed to dry and harden. Embodiments of the moldable composition comprise water, fillers including arrowroot and kaolin clay, at least one polar polymeric resin (e.g., polyvinyl alcohol), at least one thickening agent (e.g., ammonium pentaborate tetrahydrate), one or more pH adjusters (e.g., triethanolamine, sodium bicarbonate), a humectant (e.g., propylene glycol, glycerin), optionally at least one releasing agent (e.g., mineral oil), and optionally at least one additive.

19 Claims, No Drawings

MOLDABLE COMPOSITIONS AND METHODS OF USING THEREOF

CROSS REFERENCE TO RELATED APPLICATIONS

This application claims priority to U.S. Provisional Application No. 62/533,348, filed Jul. 17, 2017, which is incorporated by reference herein, in its entirety and for all purposes.

FIELD OF THE INVENTION

The present invention relates generally to moldable compositions for use as children's craft products, and more particularly to moldable compositions that resist cracking and slumping when allowed to harden.

BACKGROUND OF THE INVENTION

Art materials for the entertainment and developmental benefit of children are well-known. For example, many varieties of modeling materials, such as clays or other moldable compositions, are typically given to children to produce sculptures or figures and to stimulate the children's creativity and imagination. These clays or other moldable compositions are also useful for general artistic purposes. U.S. patents relating to moldable compositions include U.S. Pat. No. 6,359,057 to Li, U.S. Pat. No. 5,171,766 to Mariano et al., U.S. Pat. No. 5,364,892 to Miller et al., U.S. Pat. No. 5,498,645 to Mariano et al., and U.S. Pat. No. 5,506,280 to Miller et al., which are incorporated by reference herein.

Drawbacks of some of these moldable compositions include "slumping" or "cracking" during the hardening process as they are dried. "Slumping" occurs when the composition collapses slowly under the force of gravity, distorting the shape of the figure or sculpture during the drying process. "Cracking" is the appearance of rifts or breaks in the moldable composition during the drying process. Both cracking and slumping distort the appearance of the sculpted product during drying, leading to a less satisfying result for the user of the moldable compositions.

Thus, there exists a need for moldable compositions that overcome these drawbacks by having the ability to dry and harden in ambient conditions (e.g., by air-drying) while resisting the tendency to slump or crack.

SUMMARY OF THE INVENTION

An embodiment of the present invention provides moldable compositions for sculpting. The moldable compositions comprise water, fillers including arrowroot and kaolin clay, at least one polar polymeric resin (e.g, polyvinyl alcohol), at least one thickening agent (e.g., ammonium pentaborate tetrahydrate), one or more pH adjusters (e.g., triethanolamine, sodium bicarbonate), a humectant (e.g., propylene glycol, glycerin), optionally at least one releasing agent (e.g., mineral oil), and optionally at least one additive (e.g., dispersants, defoamers, preservatives, colorants, and scents). It has surprisingly been found that compositions according to the present invention resist slumping and cracking during the drying process, thereby preserving the desired sculpted shape when hardened.

Another embodiment of the present invention provides a method of using the moldable composition including molding the moldable composition into a desired shape, and drying the moldable composition such that it forms a hardened composition.

DETAILED DESCRIPTION OF THE INVENTION

The present invention relates to moldable compositions that resist cracking and slumping during the drying and hardening process, as well as methods for use of the moldable compositions. It has been surprisingly found that the moldable compositions according to the present invention are capable of being sculpted into shapes and allowed to dry and harden with minimal slumping or cracking during the drying process. Resistance to cracking and slumping is a feature that improves the appeal and utility of the present moldable composition to children in comparison to other known moldable compositions, as the sculptures created with the present moldable compositions will better retain their shapes during the drying and hardening process.

According to particular embodiments, the compositions have a hardening capability, such that they are initially moldable but are capable of drying and hardening under ambient conditions (e.g., when left in the open air at room temperature for a period of time allowing moisture to evaporate from the composition) to a hardened form in the sculpted shape. Unlike other known moldable compositions which are prone to slumping and cracking during the drying process (and thus prone to distortions in the sculpted shape when dried), embodiments of the present moldable compositions resist cracking and slumping to retain the sculpted shape when hardened.

According to certain embodiments, the moldable composition of the present invention comprises water, at least one carbohydrate filler including arrowroot, at least one high-density inorganic filler including kaolin clay, at least one polar polymeric resin (e.g, polyvinyl alcohol), at least one thickening agent (e.g., ammonium pentaborate tetrahydrate), one or more pH adjusters (e.g., triethanolamine, sodium bicarbonate), a humectant (e.g., propylene glycol, glycerin), optionally at least one releasing agent (e.g., mineral oil), and optionally at least one additive (e.g., dispersants, defoamers, preservatives, colorants, and scents).

The moldable composition may comprise, consist essentially of, or consist of between about 10 wt % and about 60 wt % water; between about 15 wt % and about 60 wt % arrowroot; between about 3 wt % and about 12 wt % kaolin clay; between about 0.5 wt % and about 10 wt % polar polymeric resin (e.g., polyvinyl alcohol); between about 0.1 wt % and about 10 wt % at least one thickening agent (e.g., ammonium pentaborate tetrahydrate); between about 0.1 wt % and about 10 wt % at least one pH adjuster (e.g., triethanolamine, sodium bicarbonate); optionally between about 0.1 wt % and about 10 wt % releasing agent(s) (e.g., mineral oil); and optionally between about 0.1 wt % and about 5 wt % additive(s) (e.g., dispersants, defoamers, preservatives, colorants, and scents).

Alternatively, the moldable composition may comprise, consist essentially of, or consist of between about 20 wt % and about 40 wt % water; between about 10 wt % and about 50 wt % arrowroot; between about 1 wt % and about 20 wt % kaolin clay; between about 1 wt % and about 5 wt % polar polymeric resin (e.g., polyvinyl alcohol); between about 0.1 wt % and about 5 wt % at least one thickening agent (e.g., ammonium pentaborate tetrahydrate); between about 1 wt % and about 5 wt % at least one pH adjuster (e.g., triethanolamine, sodium bicarbonate); optionally between about 0.5 wt % and about 5 wt % releasing agent(s) (e.g., mineral oil); and optionally between about 0.5 wt % and about 5 wt % additive(s) (e.g., dispersants, defoamers, preservatives, colorants, and scents).

Other exemplary embodiments of the composition may comprise, consist essentially of, or consist of between about 10 wt % and about 60 wt % water; between about 10 wt % and about 60 wt % arrowroot; between about 2 wt % and about 60 wt % kaolin clay; between about 0.5 wt % and about 10 wt % polar polymeric resin (e.g., polyvinyl alcohol); between about 0.1 wt % and about 10 wt % at least one thickening agent (e.g., ammonium pentaborate tetrahydrate); between about 0.1 wt % and about 10 wt % at least one pH adjuster (e.g., triethanolamine, sodium bicarbonate); optionally between about 0.1 wt % and about 10 wt % releasing agent(s) (e.g., mineral oil); and optionally between about 0.1 wt % and about 10 wt % additive(s) (e.g., dispersants, defoamers, preservatives, colorants, and scents).

The compositions of the present invention include a sufficient amount of water to act as a solvent for the other components, but preferably not so much water such that the compositions substantially shrink during the drying process as the water evaporates. The compositions preferably maintain a high dry strength upon hardening. In particular embodiments of the present invention, moldable compositions comprise between about 10 wt % and about 50 wt % water, or between about 20 wt % and about 40 wt % water. The amount of water in the composition may decrease over time as the composition is dried and hardened (i.e., as the water evaporates).

The compositions of the present invention include at least one polar polymeric resin as a binder. Various polar polymeric resins known to persons skilled in the art may be used, including poly(vinyl alcohol), poly(acrylic acid), gums, starches, and any polymer including —OH groups capable of gelling with one or more thickening agents. In certain embodiments, compositions of the present invention comprise between about 0.5 wt % and about 10 wt % polar polymeric resin, or between about 1 wt % and about 5 wt % polar polymeric resin.

According to particular embodiments, the polar polymeric resin comprises, consists essentially of, or consists of polyvinyl alcohol (PVA). The PVA may be partially or fully hydrolyzed. In certain embodiments, the composition includes partially hydrolyzed PVA (about 80% to about 95%, or about 85% to about 90%, or about 87% to about 89% hydrolyzed). A particularly preferred type of PVA is Celvol® 523.

The compositions of the present invention also include one or more thickening agents. The one or more thickening agents preferably comprise a boric compound, such as boric acid, a borate salt, or a hydrate of a borate salt (e.g., ammonium borate, zinc borate, sodium borate, ammonium pentaborate tetrahydrate), or a similar salt or hydrate (e.g., sodium aluminate). Preferably, the compositions of the present invention comprise ammonium pentaborate tetrahydrate as the thickening agent. In certain embodiments, compositions of the present invention comprise between about 0.1 wt % and about 10 wt % of at least one thickening agent, or between about 0.5 wt % and about 5 wt % of at least one thickening agent.

Other thickening agents may be present in certain embodiments of the moldable compositions as well, such as locust bean gum, xanthan gum and/or guar gum. Without being bound by any particular theory, it is believed that locust bean gum, xanthan gum and guar gum may interact with boric compounds and similar compounds to contribute to slight or minimal cross-linking, thereby imparting a thickening function. Non-limiting examples of other thickening agents include titanates, vanadates, zincates, dialdehydes such as glutaraldehyde, polyfunctional acids such as adipic and citric acids, polyfunctional acid anhydrides such as trimellitic anhydride, non-monovalent cations such as $Ca^{2+}$, $Fe^{3+}$, etc.

The compositions of the present invention include at least one pH adjuster. Suitable pH adjusters according to particular embodiments include triethanolamine, phosphoric acid, sodium bicarbonate, calcium carbonate, sodium hydroxide, or potassium hydroxide. Preferably, the compositions of the present invention comprise triethanolamine (TEA). The compositions of the present invention preferably include between about 0.1 wt % and about 10 wt % of at least one pH adjuster, or between about 1 wt % and about 5 wt % of at least one pH adjuster.

The compositions of the present invention include at least one carbohydrate filler comprising arrowroot. Other carbohydrate fillers may also be present in certain embodiments in addition to the arrowroot, such as corn starch, potato starch, rice starch, cellulose, wood flour, wheat starch, tapioca flour, or wheat flour. According to certain embodiments, the compositions of the present invention comprise between about 10 wt % and about 60 wt % of at least one carbohydrate filler including arrowroot, or between about 30 wt % and about 50 wt % of at least one carbohydrate filler including arrowroot.

The compositions of the present invention also include at least one inert, high-density inorganic filler including kaolin clay. Other high-density, inert, inorganic fillers may also be present in certain embodiments in addition to the kaolin clay, such as laponite clay (and other clays), calcium carbonate, diatomaceous earth, and sand. In a particular embodiment, the composition includes between about 3 wt % and about 60 wt % of a high-density, inert, inorganic filler comprising kaolin clay, or between about 1 wt % and about 20 wt % of a high-density, inert, inorganic filler comprising kaolin clay; or between about 10 wt % and about 60 wt % of a high-density, inert, inorganic filler comprising kaolin clay.

Without being bound by any particular theory, it is believed by the inventors that the combination of the arrowroot carbohydrate filler and the kaolin clay inorganic filler results in a synergistic relationship that imparts to the compositions of the present invention their surprising and unexpected resistance to cracking and slumping during the drying process.

In particular embodiments, compositions of the present invention include one or more humectants. Humectants generally inhibit drying and increase the amount of time that the composition remains moldable prior to drying and hardening. There are many suitable humectants that may be employed, including glycerin, propylene glycol, triglycerol, poly(ethylene) glycol, diethylene glycol, and combinations thereof. In particular embodiments, the composition includes glycerin and/or propylene glycol as humectants. The composition preferably includes between about 1 wt % and about 30 wt % of at least one humectant, or between about 5 wt % and about 25 wt % of at least one humectant.

According to certain embodiments, moldable compositions of the present invention include at least one releasing agent to reduce tackiness. Suitable releasing agents include mineral oil, vegetable oil, silicone oil, petrolatum, and silicone wax. Preferably, certain embodiments of the present invention include mineral oil as the releasing agent. In a particular embodiment, the composition includes between about 0.1 wt % and about 10 wt % releasing agent(s), or between about 0.5 wt % and about 5 wt % releasing agent(s).

In particular embodiments, compositions of the present invention also include low-density inert fillers. Such fillers decrease the overall density of the compositions according to the present invention. Some examples of these low-density inert fillers include calcium carbonate-coated polyvinylidene chloride/acrylonitrile microspheres, silica, low-density expanded polymer beads, or low-density glass microbeads. In a particular embodiment, the composition includes calcium carbonate-coated polyvinylidene chloride/acrylonitrile microspheres. A particularly preferred type of calcium carbonate-coated polyvinylidene chloride/acrylonitrile microspheres is Dualite® microspheres. In particular embodiments of the compositions, the compositions include between about 10 wt % and about 20 wt % low-density inert fillers.

According to certain embodiments, compositions of the present invention include one or more additional additives. These additives may include, but are not limited to, defoamers, dispersing agents, scents, glitter, preservatives, and/or colorants. In particular embodiments, the compositions of the present invention comprise between about 0.1 wt % and about 10 wt % additive(s), or between about 0.5 wt % and about 3 wt % additive(s).

Such additives are readily available from numerous sources. Defoamers, such as Foamex® 825, can be added to eliminate air bubbles upon mixing of the components. One or more preservatives, such as anti-microbial agents and fungicides, can be added to increase the shelf life of the compositions according to the present invention. Some examples of preservatives include Fungitrol® 940, Kathon® LX, Nuosept® 95, Acticide® LA, Tektamer® 38 AD, and Polyphase® P100. Dispersants, such as Hydropalat® 44, can be added to aid in mixing of the components. One or more colorants, such as pigments or dyes, may optionally be used in the composition. A scent or fragrance may also be added to the composition.

According to one embodiment, the moldable composition comprises, consists essentially of, or consists of: water; glycerin; polyvinyl alcohol; propylene glycol; at least one carbohydrate filler including arrowroot; at least one inert inorganic filler including kaolin clay; mineral oil; at least one pH adjuster; at least one borate compound (e.g., ammonium pentaborate tetrahydrate) and at least one additive selected from the group consisting of defoamers, dispersants, preservatives (e.g., fungicides, anti-microbial agents), colorants and scents.

A method according to the present invention comprises combining all of the components of the compositions described above and thoroughly mixing them until they display a substantially uniform color, consistency, and texture. According to certain aspects of the present invention, a method for making a moldable composition comprises mixing the components of the compositions described above, namely, water, at least one polar polymeric resin, at least one thickening agent, at least one humectant, at least one pH adjuster, at least one carbohydrate filler including arrowroot, at least one inert inorganic filler including kaolin clay, optionally at least one releasing agent, and optionally at least one additive (e.g., one or more defoamers, dispersing agents, scents, preservatives, colorants, glitter or a combination thereof) in the weight percentages described above. According to particular embodiments, the mixing is carried out at room temperature (i.e., the method is free of any heating steps).

According to one embodiment, the method comprises mixing water, polyvinyl alcohol, glycerin, propylene glycol, anti-foam agent(s), dispersant(s), preservative(s), and pH buffer(s)/adjuster(s) (e.g., phosphoric acid) until a substantially homogeneous composition results. The order of mixing ingredients can vary. According to another embodiment, the method includes mixing this homogeneous composition with arrowroot, kaolin clay, mineral oil, and a borate salt (e.g., ammonium pentaborate tetrahydrate or "AMPBTH" as used herein), additional water, additional humectant (e.g., more propylene glycol), a further pH buffer/adjuster (e.g., triethanolamine), and a further filler (e.g., Dualite® microspheres). According to yet another embodiment, a further thickening agent (e.g., guar gum and/or xanthan gum), and additional releasing agent (e.g., mineral oil) may be added, as well as colorants, glitter, and/or scents. The order of mixing these ingredients may also vary.

A method for using a moldable composition of the present invention comprises molding the moldable composition into a desired shape, and exposing the moldable composition to air (e.g., ambient air at room temperature, about 20° C.-about 25° C., or in an oven that is heated to a temperature greater than room temperature), for a period of time sufficient for the moldable composition to become a hardened composition (i.e., exposing the composition to air comprises leaving the moldable composition outside of any enclosure, such as a container, that would substantially prevent moisture from evaporating off of the composition), wherein the moldable composition comprises any of the moldable compositions described herein.

As used herein, a percentage (%) refers to a weight percentage of the composition (with the "composition" referring to all of the components in the total composition, including any components that are premixed prior to being combined with the rest of the components), unless indicated otherwise.

The embodiments of the invention are described above using the term "comprising" and variations thereof. However, it is the intent of the inventors that the term "comprising" may be substituted in any of the embodiments described herein with "consisting of" and "consisting essentially of" without departing from the scope of the invention.

The following examples are provided to describe the invention in greater detail and are intended to illustrate, not limit, the invention.

EXAMPLES

While exemplary compositions are set forth below, alternative compositions will be apparent to those skilled in the art. Such artisans will be able to modify the compositions with an eye toward the desired performance properties and intended use.

Example 1

A moldable composition according to an embodiment of the invention was made according to the following method. A mixture ("PVA Premix") as shown in Table 1 comprising water, polyvinyl alcohol, glycerin, propylene glycol, defoamer, dispersant, preservatives, and phosphoric acid were added to a mixing vessel. Arrowroot, kaolin clay, and mineral oil were then added to the PVA Premix, followed by ammonium pentaborate tetrahydrate and a colorant blend to produce the desired color of the composition. This order of mixing can be modified, as needed. The mixture was kneaded for approximately 5-6 minutes until it became substantially homogeneous.

TABLE 1

PVA Premix

| Component | Weight Percentage (wt %) |
|---|---|
| Water | 49.77 PVA Premix |
| Glycerin (humectant) | 16.54 |
| Foamex ® 825 (defoamer) | 0.83 |
| Hydropalat ® 44 (dispersant/anionic electrolyte) | 1.65 |
| Celvol ® 523 Polyvinyl Alcohol (PVA) | 11.56 |
| Propylene Glycol (humectant) | 17.50 |
| Fungitrol ® 940 (preservative) | 0.63 |
| Tektamer 38 AD (preservative) | 0.78 |
| Phosphoric Acid (62%) (pH adjuster) | 0.74 |
| TOTAL | 100.00 |

Example 2

Exemplary moldable compositions are shown in Table 2 below. Each of the compositions include the "PVA Premix" described in Example 1, but include different colorants/colorant blends and demonstrate compositional quantity differences based on the colorant blends used to produce the various desired colors of the exemplary compositions (e.g., the exemplary white composition includes no colorants or colorant blends).

TABLE 2

| Component | Light Blue Green (wt %) | Yellow (wt %) | Orange (wt %) | Red (wt %) | Black (wt %) | Blue (wt %) | Brown (wt %) | White (wt %) |
|---|---|---|---|---|---|---|---|---|
| Water | 10.497 | 10.497 | 10.457 | 10.154 | 10.376 | 10.264 | 10.350 | 10.550 |
| Ammonium Pentaborate Tetrahydrate | 0.597 | 0.597 | 0.594 | 0.577 | 0.588 | 0.583 | 0.590 | 0.600 |
| Triethanolamine (TEA) | 1.094 | 1.095 | 1.090 | 1.059 | 1.082 | 1.070 | 1.080 | 1.100 |
| Propylene Glycol | 7.462 | 7.463 | 7.434 | 7.218 | 7.377 | 7.296 | 7.360 | 7.500 |
| Mineral Oil | 0.995 | 0.995 | 0.991 | 0.962 | 0.984 | 0.973 | 0.980 | 1.000 |
| Arrowroot Powder | 20.396 | 20.399 | 20.319 | 19.730 | 20.163 | 19.944 | 20.110 | 20.500 |
| Dualite ® Microspheres | 15.421 | 15.423 | 15.363 | 14.917 | 15.245 | 15.079 | 15.200 | 15.500 |
| Kaolin Clay | 3.233 | 3.234 | 3.221 | 3.128 | 3.197 | 3.162 | 3.190 | 3.250 |
| Colorant Blend | 0.509 | 0.495 | 0.885 | 3.758 | 1.646 | 2.714 | 1.920 | 0.000 |
| PVA Premix | 39.796 | 39.802 | 39.646 | 38.497 | 39.342 | 38.915 | 39.220 | 40.000 |
| TOTAL | 100.000 | 100.000 | 100.000 | 100.000 | 100.000 | 100.000 | 100.000 | 100.000 |

Example 3

Further exemplary moldable compositions are shown in Table 3 below. Each of the compositions includes different colorants/colorant blends and demonstrate compositional quantity differences based on the colorant blends used to produce the various desired colors (e.g., the exemplary white composition includes no colorants or colorant blends).

TABLE 3

| Component | Light Blue Green (wt %) | Yellow (wt %) | Orange (wt %) | Red (wt %) | Black (wt %) | Blue (wt %) | Brown (wt %) | White (wt %) |
|---|---|---|---|---|---|---|---|---|
| Water | 30.307 | 30.309 | 30.192 | 29.316 | 29.958 | 29.633 | 29.878 | 30.460 |
| Glycerin | 6.582 | 6.583 | 6.557 | 6.367 | 6.507 | 6.437 | 6.489 | 6.616 |
| Foamex ® 825 | 0.330 | 0.330 | 0.329 | 0.320 | 0.327 | 0.323 | 0.326 | 0.332 |
| Hydropalat ® 44 | 0.657 | 0.657 | 0.654 | 0.635 | 0.649 | 0.642 | 0.647 | 0.660 |
| PVA | 4.600 | 4.601 | 4.583 | 4.450 | 4.548 | 4.499 | 4.535 | 4.624 |
| Propylene Glycol | 14.426 | 14.428 | 14.372 | 13.955 | 14.262 | 14.106 | 14.222 | 14.500 |
| Fungitrol ® 940 | 0.249 | 0.249 | 0.248 | 0.241 | 0.246 | 0.243 | 0.245 | 0.250 |
| Tektamer ® 38 AD | 0.310 | 0.310 | 0.309 | 0.300 | 0.307 | 0.304 | 0.306 | 0.312 |
| Phosphoric Acid (62%) | 0.294 | 0.295 | 0.293 | 0.285 | 0.291 | 0.288 | 0.290 | 0.296 |
| Ammonium Pentaborate Tetrahydrate | 0.597 | 0.597 | 0.594 | 0.577 | 0.588 | 0.583 | 0.589 | 0.600 |
| Triethanolamine (TEA) | 1.094 | 1.095 | 1.090 | 1.059 | 1.082 | 1.070 | 1.079 | 1.100 |
| Mineral Oil | 0.995 | 0.995 | 0.991 | 0.962 | 0.984 | 0.973 | 0.981 | 1.000 |
| Arrowroot Powder | 20.396 | 20.399 | 20.319 | 19.730 | 20.163 | 19.944 | 20.107 | 20.500 |

TABLE 3-continued

| Component | Light Blue Green (wt %) | Yellow (wt %) | Orange (wt %) | Red (wt %) | Black (wt %) | Blue (wt %) | Brown (wt %) | White (wt %) |
| --- | --- | --- | --- | --- | --- | --- | --- | --- |
| Dualite ® Microspheres | 15.421 | 15.423 | 15.363 | 14.917 | 15.245 | 15.079 | 15.203 | 15.500 |
| Kaolin Clay | 3.233 | 3.234 | 3.221 | 3.128 | 3.197 | 3.162 | 3.188 | 3.250 |
| Colorant Blend | 0.509 | 0.495 | 0.885 | 3.758 | 1.646 | 2.714 | 1.915 | 0.000 |
| TOTAL | 100.000 | 100.000 | 100.000 | 100.000 | 100.000 | 100.000 | 100.000 | 100.000 |

Although the present invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the appended claims.

What is claimed:

1. A moldable composition comprising:
between about 10 wt % and about 60 wt % water; between about 10 wt % and about 30 wt % of at least one carbohydrate filler comprising arrowroot starch; at least one inert filler comprising kaolin clay; at least one polar polymeric resin comprising polyvinyl alcohol; between about 0.1 wt % and about 10 wt % of at least one thickening agent; between about 0.1 wt % and about 10 wt % of at least one pH adjuster; optionally between about 0.1 wt % and about 10 wt % of at least one releasing agent; and optionally between about 0.1 wt % and about 10 wt % of at least one additive; wherein the kaolin clay is present in an amount between about 3.128 wt % and about 3.25 wt % and the polyvinyl alcohol is present in an amount between about 0.5 wt % and about 10 wt %, wherein the wt % is based on the total weight of the moldable composition.

2. The moldable composition of claim 1, wherein the at least one thickening agent comprises boric acid, a borate salt, or a hydrate of a borate salt.

3. The moldable composition of claim 2, wherein the at least one thickening agent comprises ammonium pentaborate tetrahydrate.

4. The moldable composition of claim 1, wherein the at least one thickening agent comprises at least one of locust bean gum, guar gum or xanthan gum.

5. The moldable composition of claim 1, wherein the at least one thickening agent is selected from a group consisting of titanates, vanadates, zincates, dialdehydes, polyfunctional acids, polyfunctional acid anhydrides, non-monovalent cations, and combinations thereof.

6. The moldable composition of claim 1, wherein the at least one pH adjuster comprises triethanolamine, phosphoric acid, sodium bicarbonate, calcium carbonate, sodium hydroxide, or potassium hydroxide.

7. The moldable composition of claim 6, wherein the at least one pH adjuster is triethanolamine.

8. The moldable composition of claim 1, wherein the at least one carbohydrate filler comprising arrowroot starch further includes at least one of corn starch, potato starch, rice starch, cellulose, wood flour, wheat starch, tapioca flour, or wheat flour.

9. The moldable composition of claim 1, wherein the at least one inert filler comprising kaolin clay further includes at least one of laponite clay, calcium carbonate, diatomaceous earth, or sand.

10. The moldable composition of claim 1, further comprising one or more low-density inert fillers.

11. The moldable composition of claim 10, wherein the one or more low-density inert fillers include calcium carbonate-coated polyvinylidene chloride/acrylonitrile microspheres, silica, low-density expanded polymer beads, or low-density glass microbeads.

12. The moldable composition of claim 1, further comprising at least one humectant.

13. The moldable composition of claim 12, wherein the at least one humectant is propylene glycol, glycerin, sorbitol, ethylene glycol, alpha hydroxyl acids, panthenol, carboxylic acid, sodium hyaluronate, sodium lactate, ammonium lactate, gelatin, or honey.

14. The moldable composition of claim 1, wherein the moldable composition comprises at least one releasing agent comprising at least one of mineral oil, silicone oil, vegetable oil, petrolatum, or silicone wax.

15. The moldable composition of claim 1, wherein the moldable composition comprises at least one additive selected from the group consisting of defoamers, dispersants, preservatives, colorants, and scents.

16. The moldable composition of claim 1 further comprising between about 1 wt % and about 30 wt % of at least one humectant.

17. The moldable composition of claim 1 comprising between about 20 wt % and about 40 wt % water; between about 1 wt % and about 5 wt % polyvinyl alcohol; between about 0.1 wt % and about 5 wt % at least one thickening agent; between about 1 wt % and about 5 wt % at least one pH adjuster; optionally between about 0.5 wt % and about 5 wt % releasing agent(s); and optionally between about 0.5 wt % and about 5 wt % additive(s).

18. The moldable composition of claim 17 further comprising between about 5 wt % and about 25 wt % of at least one humectant.

19. A method of using the moldable composition of claim 1 comprising:
molding the moldable composition into a desired shape, and
drying the moldable composition to form a hardened composition.

* * * * *